United States Patent
Jang et al.

(10) Patent No.: US 10,199,693 B2
(45) Date of Patent: Feb. 5, 2019

(54) ANODE, LITHIUM SECONDARY BATTERY COMPRISING SAME, BATTERY MODULE COMPRISING THE LITHIUM SECONDARY BATTERY, AND METHOD FOR MANUFACTURING ANODE

(71) Applicant: LG CHEM, LTD., Seoul (KR)

(72) Inventors: Minchul Jang, Daejeon (KR); Jeong Kyu Kim, Daejeon (KR); Byoungkuk Son, Daejeon (KR); Seong Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/510,813

(22) PCT Filed: Sep. 24, 2015

(86) PCT No.: PCT/KR2015/010117
§ 371 (c)(1),
(2) Date: Mar. 13, 2017

(87) PCT Pub. No.: WO2016/052932
PCT Pub. Date: Apr. 7, 2016

(65) Prior Publication Data
US 2017/0279163 A1    Sep. 28, 2017

(30) Foreign Application Priority Data
Sep. 29, 2014    (KR) ........................ 10-2014-0130622

(51) Int. Cl.
*H01M 4/38*    (2006.01)
*H01M 10/0525*    (2010.01)
(Continued)

(52) U.S. Cl.
CPC ....... *H01M 10/4235* (2013.01); *H01M 4/134* (2013.01); *H01M 4/366* (2013.01);
(Continued)

(58) Field of Classification Search
CPC ......... H01M 10/0525; H01M 10/4235; H01M 4/382; H01M 2220/30; H01M 4/386; H01M 4/134; H01M 4/366
See application file for complete search history.

(56) References Cited

U.S. PATENT DOCUMENTS

2002/0182488 A1    12/2002 Cho et al.
2007/0122700 A1    5/2007 Miyachi et al.
(Continued)

FOREIGN PATENT DOCUMENTS

| JP | 11-73946 A | 3/1999 |
|---|---|---|
| JP | 2003-36842 A | 2/2003 |

(Continued)

OTHER PUBLICATIONS

Key, B., et al, "Real-Time NMR Investigations of Strutural Changes in Silicon Electrodes for Lithium-Ion Batteries," J. Am. Chem. Soc., 2009, vol. 131, pp. 9239-9249.
(Continued)

*Primary Examiner* — Brittany L Raymond
(74) *Attorney, Agent, or Firm* — Birch, Stewart, Kolasch & Birch, LLP

(57) ABSTRACT

The present specification relates to an anode, a lithium secondary battery including the same, a battery module including the lithium secondary battery, and a method for manufacturing an anode.

13 Claims, 7 Drawing Sheets

(51) Int. Cl.
  *H01M 10/42* (2006.01)
  *H01M 4/134* (2010.01)
  *H01M 4/36* (2006.01)

(52) U.S. Cl.
  CPC ............ *H01M 4/382* (2013.01); *H01M 4/386* (2013.01); *H01M 10/0525* (2013.01); *H01M 2220/30* (2013.01)

(56) References Cited

U.S. PATENT DOCUMENTS

| | | | |
|---|---|---|---|
| 2007/0202408 A1* | 8/2007 | Nakanishi | H01M 4/134 |
| | | | 429/231.9 |
| 2007/0218365 A1 | 9/2007 | Takezawa et al. | |
| 2011/0136012 A1 | 6/2011 | Yagi et al. | |
| 2012/0107684 A1* | 5/2012 | Iwamoto | H01M 4/134 |
| | | | 429/211 |
| 2013/0130105 A1* | 5/2013 | Choi | H01M 4/131 |
| | | | 429/211 |
| 2014/0080000 A1 | 3/2014 | Han et al. | |

FOREIGN PATENT DOCUMENTS

| | | |
|---|---|---|
| JP | 2005-190902 A | 7/2005 |
| JP | 2007-227219 A | 9/2007 |
| JP | 2007-280926 A | 10/2007 |
| JP | 2011-233402 A1 | 11/2011 |
| JP | 5095863 B | 12/2012 |
| KR | 10-2012-0130709 A | 12/2012 |

OTHER PUBLICATIONS

International Search Report (PCT/ISA/210) issued in PCT/KR2015/010117, dated Jan. 29, 2016.
Key et al., "Real-Time NMR Investigations of Structural Changes in Silicon Electrodes for Lithium-Ion Batteries", Journal of the American Chemical Society, vol. 131, No. 26, 2009, pp. 9239-9249.
Office Action issued in Korean Patent Application No. 10-2015-0135692, dated Sep. 26, 2016.
Written Opinion (PCT/ISA/237) issued in PCT/KR2015/010117, dated Jan. 29, 2016.
European Office Action dated Apr. 10, 2018 for Application No. 15 845 711.9.
Japanese Office Action for JP Application No. 2017-516687 dated Dec. 3, 2018.

* cited by examiner

[Figure 1]
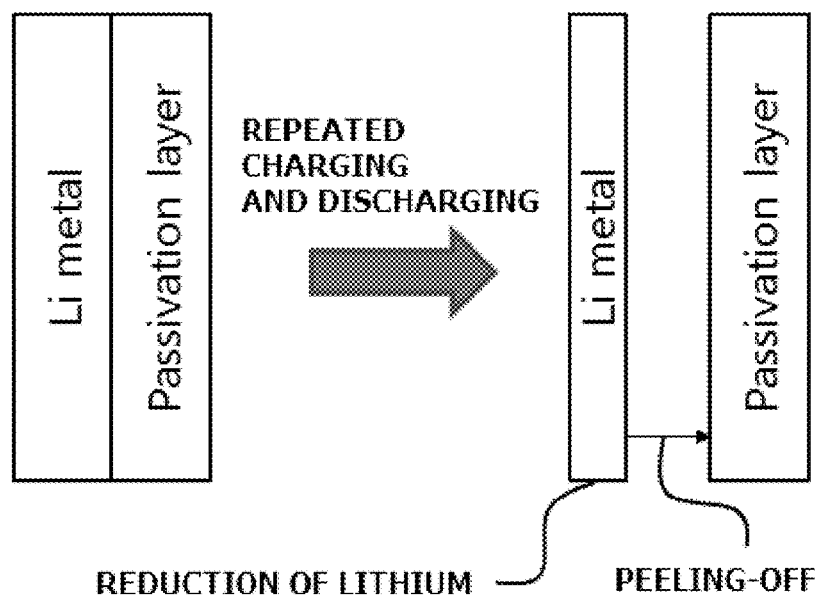

[Figure 2]
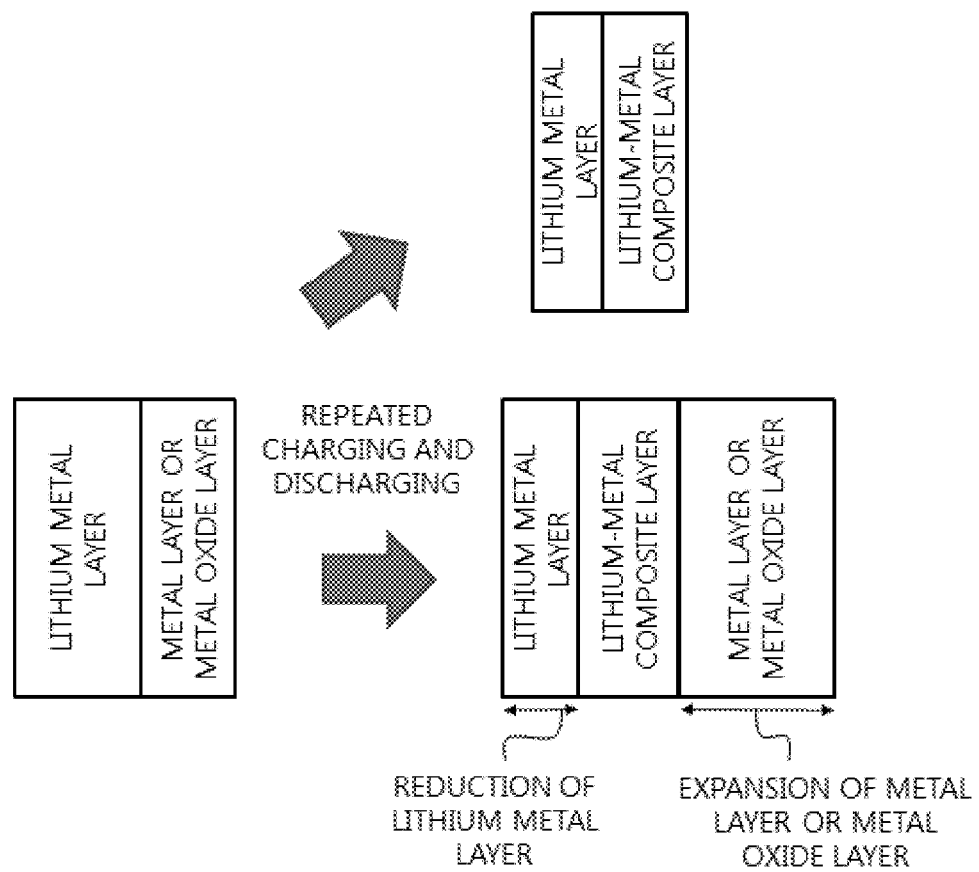

[Figure 3]
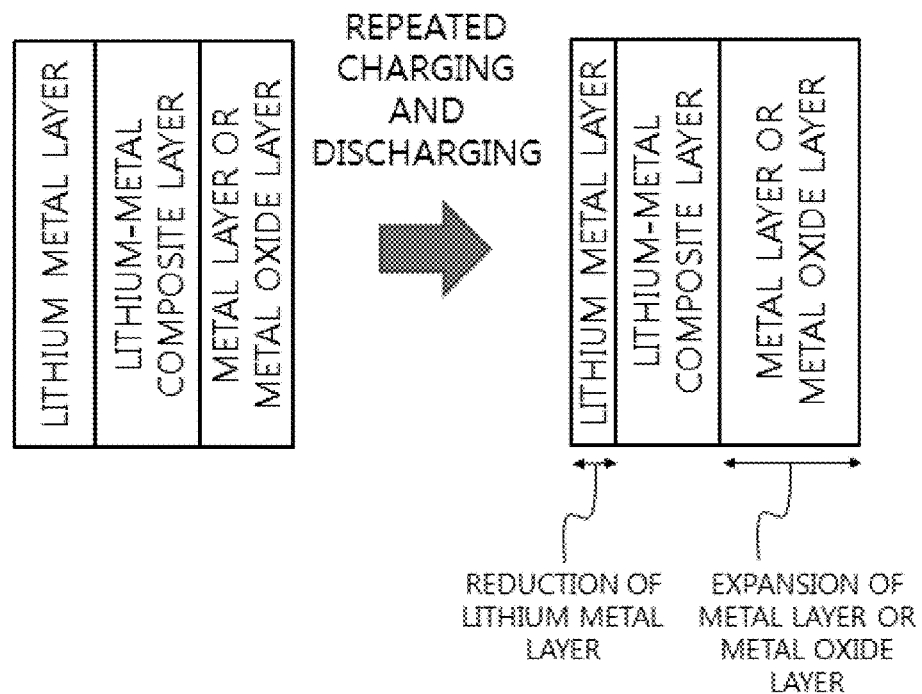

[Figure 4]
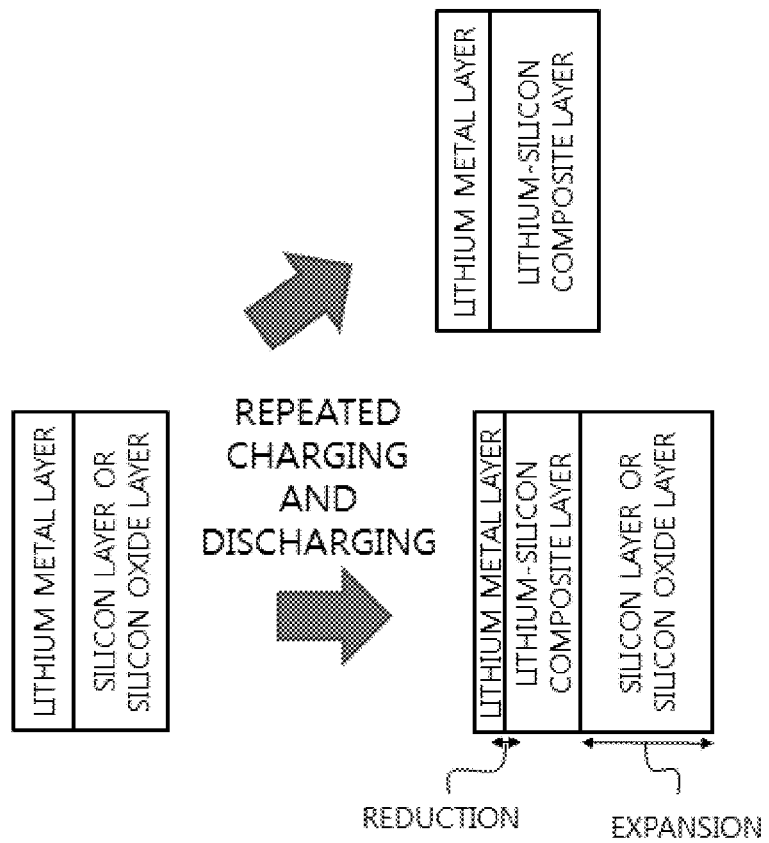

[Figure 5]
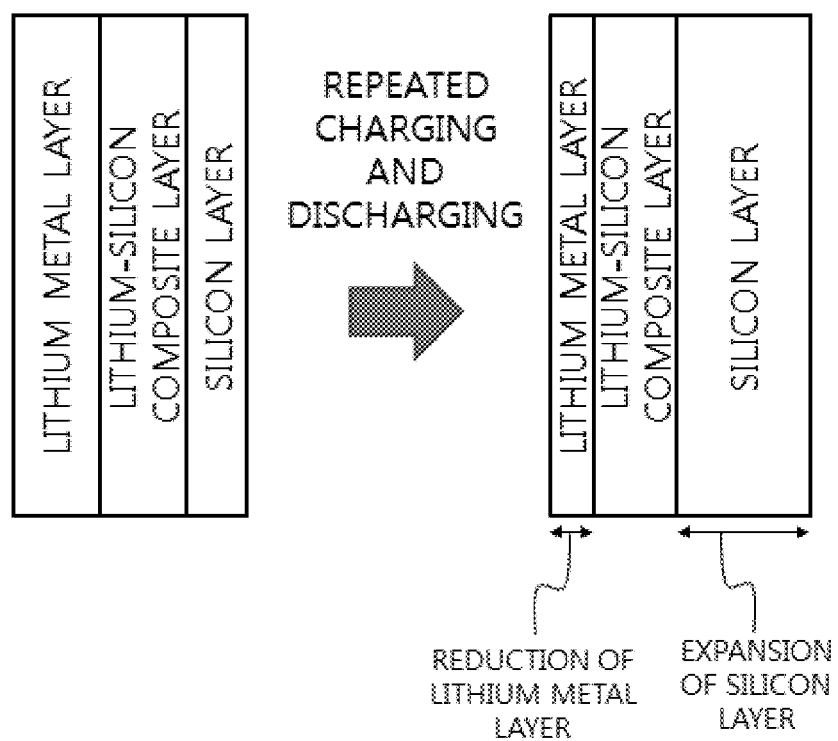

[Figure 6]
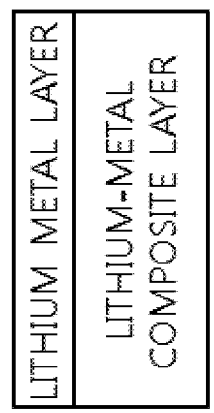

[Figure 7]
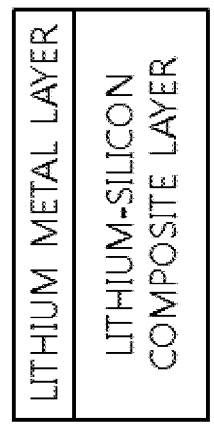

ANODE, LITHIUM SECONDARY BATTERY COMPRISING SAME, BATTERY MODULE COMPRISING THE LITHIUM SECONDARY BATTERY, AND METHOD FOR MANUFACTURING ANODE

TECHNICAL FIELD

The present invention claims priority to and the benefit of Korean Patent Application No. 10-2014-0130622 filed in the Korean Intellectual Property Office on Sep. 29, 2014, the entire contents of which are incorporated herein by reference.

The present specification relates to an anode, a lithium secondary battery including the same, a battery module including the lithium secondary battery, and a method for manufacturing an anode.

BACKGROUND ART

With the recent trend that electronic devices become compact and lightweight, a battery acting as a power source is also required to become compact and lightweight. As a battery which becomes compact and lightweight and capable of being charged and discharged at a high capacity, a lithium secondary battery is put into practical use, and is used for a mobile electronic device such as a small video camera, a mobile telephone, and a laptop computer, a communication device, and the like.

The lithium secondary battery is an energy storage device having high energy and power, and has an advantage in that the capacity or operating voltage is higher than that of other batteries. However, the lithium secondary battery has a problem in safety of the battery due to high energy, and thus has a risk such as an explosion or a fire. In particular, since hybrid automobiles which have been recently in the spotlight and the like are required to have high energy and output characteristics, it can be seen that safety is most important.

In general, the lithium secondary battery is composed of a cathode, an anode, and an electrolyte, and lithium ions released from a cathode active material by a first charging serve to transfer energy while shuttling between both electrodes, like being inserted into an anode active material, that is, carbon particles and again being dissociated during the discharge, thereby making the charge and discharge possible.

Meanwhile, as a high-capacity battery is continuously needed for the development of mobile electronic devices, a high-capacity anode material having a much higher capacity per unit weight than carbon used as the existing anode material has been actively studied.

DETAILED DESCRIPTION OF THE INVENTION

Technical Problem

The present specification has been made in an effort to provide an anode, a lithium secondary battery including the same, a battery module including the lithium secondary battery, and a method for manufacturing an anode.

Technical Solution

The present specification provides an anode including: a current collector; a lithium metal layer provided on the current collector; and a silicon layer or silicon oxide layer provided on the lithium metal layer.

Further, the present specification provides an anode including: a current collector; a lithium metal layer provided on the current collector; and a lithium-silicon composite layer provided on the lithium metal layer and containing a lithium-silicon composite in which silicon or silicon oxide is alloyed with lithium.

In addition, the present specification provides a lithium secondary battery including the anode and the cathode, and an electrolyte provided between the anode and the cathode.

Furthermore, the present application provides a battery module including the lithium secondary battery as a unit cell.

Advantageous Effects

In the anode according to an exemplary embodiment of the present specification, the chemical stability and safety of a lithium metal are improved.

The initial charge and discharge efficiency of a battery to which the anode according to an exemplary embodiment of the present specification is applied is improved.

The charge and discharge cycle characteristics of the battery to which the anode according to an exemplary embodiment of the present specification is applied are improved.

BRIEF DESCRIPTION OF DRAWINGS

FIG. 1 illustrates that a protective layer (passivation layer) is peeled off because the volume of a lithium metal varies depending on the charge and discharge of a battery.

FIG. 2 illustrates that a metal layer or metal oxide layer is not peeled off from a lithium metal layer when a battery including an anode according to an exemplary embodiment of the present specification is repeatedly charged and discharged.

FIG. 3 illustrates that a metal layer or metal oxide layer is not peeled off from a lithium metal layer when a battery including an anode according to another exemplary embodiment of the present specification is repeatedly charged and discharged.

FIG. 4 illustrates that a lithium metal layer and a silicon layer or silicon oxide layer are not peeled off when a battery including an anode according to still another exemplary embodiment of the present specification is repeatedly charged and discharged.

FIG. 5 illustrates that a lithium metal layer and a silicon layer are not peeled off when a battery including an anode according to yet another exemplary embodiment of the present specification is repeatedly charged and discharged.

FIGS. 6 and 7 are a structure of an anode according to still yet another exemplary embodiment of the present specification.

BEST MODE

Hereinafter, the present specification will be described in detail.

The present specification provides an anode including: a lithium metal layer; and a metal layer or metal oxide layer provided on the lithium metal layer and containing a metal or metal oxide capable of being alloyed with lithium.

The anode may have a thickness of 1 μm or more and 1,000 μm or less.

In the present specification, the anode may be used in a battery, and the anode means an electrode which releases electrons when the battery is discharged. The anode may be used for a secondary battery, and the anode means an electrode which releases electrons based on the time when the battery is discharged, and may serve as a cathode (reduction electrode) when the battery is charged.

The lithium metal layer means a layer including a lithium metal element. A material for the lithium metal layer may be a lithium alloy, a lithium metal, an oxide of a lithium alloy, or a lithium oxide.

In an exemplary embodiment of the present specification, the lithium metal layer may be a layer composed of only a lithium metal. In this case, the lithium metal layer may partially deteriorate due to oxygen or moisture, or may include impurities.

A lithium metal of a lithium metal layer is a metal having a standard reduction potential of −3.040 V, and a metal which very strongly tends to be oxidized. When the lithium metal meets a heterogeneous material which has an oxidizing tendency, such as oxygen, sulfur, or polysulfide, oxidation (corrosion) of the lithium metal rapidly proceeds.

When the lithium metal is used as an electrode, dendrites are formed on the surface of the lithium metal, thereby degrading the reactivity of the lithium metal.

Accordingly, a lithium salt having relatively stable lithium ions was used as an electrode material, but as a high-capacity battery is continuously required, there is an increasing need for stably using a high-capacity lithium metal as an electrode material.

The metal layer or metal oxide layer may be a layer containing a metal or metal oxide capable of being alloyed with lithium. Specifically, the metal layer or metal oxide layer may contain a metal or metal oxide which reacts with lithium to expand the volume thereof.

The metal layer may be a layer containing a metal capable of being alloyed with lithium. Specifically, the metal layer may be a layer composed of only a metal capable of being alloyed with lithium.

The metal oxide layer may be a layer containing a metal oxide capable of being alloyed with lithium. Specifically, the metal oxide layer may be a layer composed of only an oxide of a metal capable of being alloyed with lithium.

A metal which the metal layer or metal oxide layer contains is not particularly limited as long as the metal is a metal capable of being alloyed with lithium, but the metal may include, for example, any one of silicon (Si), tin (Sn), germanium (Ge), and cobalt (Co); an alloy of two or more thereof; or at least one oxide thereof. The metal oxide is not particularly limited as long as the metal oxide contains at least one of silicon (Si), tin (Sn), germanium (Ge), and cobalt (Co), but the metal oxide may be, for example, silicon oxide ($SiO_2$), tin oxide ($SnO_2$), germanium oxide ($GeO_2$), cobalt oxide (CoO, $Co_2O_3$, $CoO_2$, and $Co_3O_4$), and the like.

The metal layer or metal oxide layer may include: any one of silicon, tin, and germanium; an alloy of two or more thereof; or at least one oxide thereof.

The metal layer or metal oxide layer may be a silicon layer or silicon oxide layer containing a silicon element as the metal capable of being alloyed with lithium.

It is possible to further include a lithium-metal composite layer provided between the lithium metal layer and the metal layer or metal oxide layer.

The lithium-metal composite layer may include a lithium-metal composite or lithium-metal oxide composite formed by meeting a lithium metal element of the lithium metal layer and a metal element of the metal layer or metal oxide layer at the interface between the lithium metal layer and the metal layer or metal oxide layer.

In an exemplary embodiment of the present specification, when the metal layer or metal oxide layer is a silicon layer or silicon oxide layer containing a silicon element as the metal capable of being alloyed with lithium, it is possible to further include a lithium-silicon composite layer provided between the lithium metal layer and the silicon layer or silicon oxide layer.

In the anode, the content of a lithium-metal composite formed by alloying the metal or metal oxide with lithium may be affected by the content of the metal or metal oxide capable of being alloyed with lithium. A part or all of the metal or metal oxide capable of being alloyed with lithium included in the anode may be alloyed with lithium to form a lithium-metal composite.

When the metal layer or metal oxide layer is a silicon layer or silicon oxide layer containing a silicon element as the metal or metal oxide capable of being alloyed with lithium, the weight ratio of the lithium element to the silicon element in the anode may be 100:1 to 50.

In the anode, the content of the lithium-silicon composite formed by alloying the silicon with lithium may be affected by the content of silicon. A part or all of the silicon included in the anode may be alloyed with lithium to form a lithium-silicon composite.

The lithium-silicon composite layer may include a lithium-silicon composite or lithium-silicon oxide composite. Specifically, the lithium-silicon composite layer may include a lithium-silicon composite represented by the following Chemical Formula 1 or a lithium-silicon oxide composite represented by the following Chemical Formula 2.

$Li_xSi$                     [Chemical Formula 1]

$Li_oSiO_p$                  [Chemical Formula 2]

In Chemical Formulae 1 and 2, x is a real number of 1.0 to 4.0, o is each a real number of 0.3 to 4.0, and p is each a real number of 0.1 to 2.0.

The metal layer or metal oxide layer may receive ions containing a lithium metal transferred from an interface of the lithium metal layer or an electrolyte to include a lithium-metal composite in which the ions are bonded to the metal element of the metal layer or metal oxide layer. In other words, a part of the metal element of the metal layer or metal oxide layer may be bonded to ions containing transferred lithium to form a lithium-metal composite or lithium-metal oxide composite.

The metal layer or metal oxide layer may receive ions containing a lithium metal transferred from an interface of the lithium metal layer or an electrolyte, and thus be composed of a lithium-metal composite or lithium-metal oxide composite in which the ions are bonded to the metal element of the metal layer or metal oxide layer. In other words, all of the metal elements of the metal layer or metal oxide layer may be bonded to ions containing transferred lithium to form a lithium-metal composite or lithium-metal oxide composite.

In the present specification, when the metal layer or metal oxide layer is a silicon layer or silicon oxide layer containing a silicon element as the metal or metal oxide capable of being alloyed with lithium, the silicon layer or silicon oxide layer may include a lithium-silicon composite or lithium-silicon oxide composite.

In the present specification, when the metal layer or metal oxide layer is a silicon layer or silicon oxide layer containing a silicon element as the metal or metal oxide capable of being alloyed with lithium, the silicon layer or silicon oxide layer may receive ions containing a lithium metal transferred from an interface of the lithium metal layer or an electrolyte to include a lithium-silicon composite or metal-silicon oxide composite in which the ions are bonded to a silicon element of the silicon layer. In other words, a part of the metal element of the silicon layer or silicon oxide layer may be bonded to ions containing transferred lithium to form a lithium-silicon composite or lithium-silicon oxide composite.

In the present specification, when the metal layer or metal oxide layer is a silicon layer or silicon oxide layer containing a silicon element as the metal or metal oxide capable of being alloyed with lithium, the silicon layer or silicon oxide layer may be composed of a lithium-silicon composite or lithium-silicon oxide composite. In other words, all of the silicon elements of the silicon layer may be bonded to ions containing the transferred lithium metal to form a lithium-silicon composite or metal-silicon oxide composite.

A lithium metal is a material which is highly reactive with moisture, and thus may react with moisture, thereby making the surface of the lithium metal electrode deteriorate, or forming dendritic crystals on the surface of the lithium metal electrode.

In order to secure the chemical safety and stability of the lithium metal, as illustrated in FIG. 1, a protective film may be formed on a lithium metal electrode, but since the volume of the lithium metal is changed while charging and discharging of the battery are repeated, the protective film provided on the lithium metal may be peeled off.

However, the anode of the present specification has an advantage in that the metal layer or metal oxide layer, which is a protective layer, is not peeled off by a change in volume of the lithium metal layer, which is caused by the repeated charging and discharging. Specifically, as illustrated in FIGS. 2 and 3, since a metal layer or metal oxide layer, which is a protective layer, includes a metal or metal oxide capable of being alloyed with lithium even though the volume of the lithium metal layer is reduced while lithium of the lithium metal layer is consumed, a lithium-metal composite layer may be formed between the lithium metal layer and the metal layer or metal oxide layer, which is a protective layer, and as a result, an interface between the lithium metal layer and the metal layer or metal oxide layer may be maintained without being peeled off. Accordingly, the anode of the present specification has an advantage in that the chemical safety and stability of the lithium metal are improved.

In the present specification, when the metal layer or metal oxide layer is a silicon layer containing a silicon element as the metal or metal oxide capable of being alloyed with lithium, as illustrated in FIGS. 4 and 5, even though the volume of the lithium metal layer is reduced while the lithium of the lithium metal layer is consumed, the silicon element of the silicon layer or silicon oxide layer, which is capable of being alloyed with the lithium, reacts with the lithium metal element of the lithium metal layer to form a lithium-silicon composite layer at an interface between the lithium metal layer and the silicon layer or silicon oxide layer, and as a result, the interface between the lithium metal layer and the silicon layer may be maintained without being peeled off.

The initial charge and discharge efficiency of a battery to which the anode according to an exemplary embodiment of the present specification is applied may be improved. Since the interface between the lithium metal layer and the metal or metal oxide layer is maintained without being peeled off, the initial efficiency and the efficiency of the cycle are improved.

The anode may further include a current collector. Specifically, the anode may include a current collector, a lithium metal layer provided on the current collector, and a metal layer or metal oxide layer provided on the lithium metal layer.

The current collector collects current of an anode, uses any material having electric conductivity without limitation, and may be manufactured by using materials and methods generally used in the art. For example, it is possible to use one or two or more selected from the group consisting of carbon, stainless steel, nickel, aluminum, iron, and titanium.

As a shape of the current collector, various shapes such as a film, a sheet, foil, a net, a porous body, a foam body, or a non-woven body may be each employed.

The present specification provides an anode including: a current collector; a lithium metal layer provided on the current collector; and a silicon layer or silicon oxide layer provided on the lithium metal layer.

The overlapped explanation on the anode in which the silicon layer or silicon oxide layer is provided on the lithium metal layer will be omitted, and those described above may be cited.

The anode may further include a lithium-silicon composite layer provided between the lithium metal layer and the silicon layer or silicon oxide layer.

The silicon layer or silicon oxide layer may include a lithium-silicon composite or lithium-silicon oxide composite in which the silicon or silicon oxide is alloyed with lithium.

The weight ratio of the lithium element to the silicon element in the anode may be 100:1 to 50.

The lithium-silicon composite layer may include the lithium-silicon composite represented by Chemical Formula 1 or the lithium-silicon oxide composite represented by Chemical Formula 2.

The present specification provides an anode including: a lithium metal layer; and a lithium-metal composite layer provided on the lithium metal layer and containing a lithium-metal composite or lithium-metal oxide composite in which a metal or metal oxide capable of being alloyed with lithium is alloyed with lithium.

The lithium-metal composite layer may be a layer in which all of the metal elements of the metal layer or metal oxide layer, which is capable of being alloyed with the lithium, are bonded to ions containing the lithium metal to form a lithium-metal composite or lithium-metal oxide composite.

As illustrated in FIG. 6, the anode may include a lithium metal layer; and a lithium-metal composite layer on the lithium metal layer.

The lithium-metal composite layer may be a lithium-silicon composite layer containing a silicon element as a metal or metal oxide capable of being alloyed with lithium.

The lithium-silicon composite layer may be a layer in which all of the silicon elements of the silicon layer or silicon oxide layer are bonded to ions containing the lithium metal to form a lithium-silicon composite or lithium-silicon oxide composite.

As illustrated in FIG. 7, the anode may include a lithium metal layer; and a lithium-silicon composite layer on the lithium metal layer.

The lithium-silicon composite layer may include a lithium-silicon composite represented by the following Chemical Formula 1 or a lithium-silicon oxide composite represented by the following Chemical Formula 2.

$$Li_xSi \quad \text{[Chemical Formula 1]}$$

$$Li_oSiO_p \quad \text{[Chemical Formula 2]}$$

In Chemical Formulae 1 and 2, x is a real number of 1.0 to 4.0, o is each a real number of 0.3 to 4.0, and p is each a real number of 0.1 to 2.0.

The present specification provides an anode including: a current collector; a lithium metal layer provided on the current collector; and a lithium-silicon composite layer provided on the lithium metal layer and containing a lithium-silicon composite in which silicon or silicon oxide is alloyed with lithium.

The overlapped explanation on the anode in which the lithium-silicon composite layer is provided on the lithium metal layer will be omitted, and those described above may be cited.

The lithium-silicon composite layer may include the lithium-silicon composite represented by Chemical Formula 1 or the lithium-silicon oxide composite represented by Chemical Formula 2.

The present specification provides a lithium secondary battery including the anode; and the cathode, and an electrolyte provided between the anode and the cathode.

The shape of the lithium secondary battery is not limited, and may be, for example, a coin-type, a flat plat-type, a cylinder-type, a cone-type, a button-type, a sheet-type, or a laminate-type.

The lithium secondary battery may be a lithium air battery. Specifically, a cathode of the lithium secondary battery may be an air electrode.

The lithium secondary battery may be manufactured as a flow battery by further including each tank which stores a cathode electrolytic solution and an anode electrolytic solution and a pump which allows each electrolytic solution to move to an electrode cell.

The electrolyte may be an electrolyte liquid in which the anode and the cathode are impregnated.

The lithium secondary battery may further include a separation membrane provided between the anode and the cathode. As the separation membrane disposed between the anode and the cathode, it is possible to use any separation membrane as long as the separation membrane may separate or insulate the anode and the cathode, and enable ions to move between the anode and the cathode. For example, the separation membrane may be a non-conductive porous membrane or an insulating porous membrane. More specifically, it is possible to exemplify a polymer non-woven fabric such as a non-woven fabric formed of a polypropylene material or a non-woven fabric formed of a polyphenylene sulfide material; or a porous film formed of an olefin-based resin such as polyethylene or polypropylene, and it is also possible to use a combination of two or more thereof.

The lithium secondary battery may further include a cathode electrolytic solution at a cathode side and an anode electrolytic solution at an anode side, which are divided by a separation membrane. The cathode electrolytic solution and the anode electrolytic solution may include a solvent and an electrolytic salt, respectively. The cathode electrolytic solution and the anode electrolytic solution may include solvents which are the same as or different from each other.

The electrolytic solution may be an aqueous electrolytic solution or a non-aqueous electrolytic solution. The aqueous electrolytic solution may include water as a solvent, and the non-aqueous electrolytic solution may include a non-aqueous solvent as a solvent.

As the non-aqueous solvent, those generally used in the art may be selected, and the non-aqueous solvent is not particularly limited, but for example, it is possible to select the non-aqueous solvent from the group consisting of carbonate-based, ester-based, ether-based, ketone-based, organosulfur-based, organophosphorous-based, and non-protonic solvents, and combinations thereof.

The electrolytic salt refers to a salt which is dissociated into a positive ion and a negative ion in water or a non-aqueous organic solvent, and is not particularly limited as long as the electrolytic salt may transfer lithium ions in a lithium secondary battery, and those generally used in the art may be selected.

The concentration of electrolytic salt in the electrolytic solution may be 0.1 M or more and 3 M or less. In this case, charge and discharge characteristics of the lithium secondary battery may be effectively exhibited.

The electrolyte may be a solid electrolyte membrane or a polymer electrolyte membrane.

A material for the solid electrolyte membrane and the polymer electrolyte membrane is not particularly limited, and those generally used in the art may be employed. For example, the solid electrolyte membrane may include a composite metal oxide, and the polymer electrolyte membrane may be a membrane in which a conductive polymer is provided inside a porous base material.

The cathode means an electrode in which when the battery is discharged in the lithium secondary battery, electrons are received and lithium-containing ions are reduced. In contrast, when the battery is charged, the cathode serves as an anode (oxidation electrode), so that a cathode active material is oxidized to release electrons and lose lithium-containing ions.

The cathode may include a cathode current collector and a cathode active material layer formed on the cathode current collector.

In the present specification, a material for the cathode active material of the cathode active material layer is not particularly limited as long as the material is applied together with the anode to a lithium secondary battery, and as a result, lithium-containing ions may be reduced and oxidized during the discharging and during the charging, respectively. For example, the material may be a transition metal oxide, and specifically, may include at least one of $LiCoO_2$, $LiNiO_2$, $LiFePO_4$, $LiMn_2O_4$, $LiNi_xCo_yMn_zO_2$ (here, x+y+z=1), $Li_2FeSiO_4$, $Li_2FePO_4F$, and $Li_2MnO_3$. The present specification provides a battery module including the lithium secondary battery as a unit cell.

The battery module may be formed by stacking the unit cell as a bipolar plate provided between two or more lithium secondary batteries according to one exemplary embodiment of the present specification.

When the lithium secondary battery is a lithium air battery, the bipolar plate may be porous, such that the air supplied from the outside may be supplied to a cathode included in each of the lithium air batteries. For example, the bipolar plate may include a porous stainless steel or a porous ceramic.

The battery module may be specifically used as a power source for an electric vehicle, a hybrid electric vehicle, a plug-in hybrid electric vehicle, or a power storage device.

The present specification provides a method for manufacturing an anode, the method including: preparing a lithium metal layer; preparing a metal layer or metal oxide layer; and attaching the prepared lithium metal layer to the metal layer or metal oxide layer. The metal layer or metal oxide layer may be a silicon layer or silicon oxide layer containing a silicon element as the metal or metal oxide capable of being alloyed with lithium.

In the method of attaching the lithium metal layer to the metal layer or metal oxide layer, the lithium metal layer may be compressed to the metal layer or metal oxide layer by pressure or thermally compressed to the metal layer or metal oxide layer by heat and pressure.

The present specification provides a method for manufacturing an anode, the method including: preparing a lithium metal layer; and forming a metal layer or metal oxide layer on the lithium metal layer. The metal layer or metal oxide layer may be a silicon layer or silicon oxide layer containing a silicon element as the metal or metal oxide capable of being alloyed with lithium.

In the method of forming a metal layer or metal oxide layer on a lithium metal layer, the metal layer or metal oxide layer may be formed by depositing a metal or metal oxide on a lithium metal layer or applying a composition including a metal or metal oxide on a lithium metal layer.

The composition including the metal or metal oxide may further include a binder resin.

When a silicon layer or silicon oxide layer containing a silicon atom as the metal or metal oxide capable of being alloyed with lithium is prepared, the composition may include silicon or silicon oxide, a binder resin, and a solvent.

The kinds of binder resin and solvent are not particularly limited, but it is possible to employ those generally used in the art. For example, the binder resin may include polyvinylidene fluoride (PVdF).

Based on 100 parts by weight of the silicon or silicon oxide, the content of the binder resin may be 5 parts by weight to 20 parts by weight.

The present specification provides a method for manufacturing an anode, the method including: preparing a metal layer or metal oxide layer; and forming a lithium metal layer on the metal layer or metal oxide layer. The metal layer or metal oxide layer may be a silicon layer or silicon oxide layer containing a silicon element as the metal or metal oxide capable of being alloyed with lithium.

As the method of forming a lithium metal layer on a metal layer or metal oxide layer, a lithium metal layer may be formed by depositing a lithium metal or applying a soft lithium metal, or a sputtering method.

When the metal layer or metal oxide layer is a silicon layer or silicon oxide layer containing a silicon atom as the metal or metal oxide capable of being alloyed with lithium, the silicon layer or silicon oxide layer may be formed by depositing silicon, or may be manufactured by depositing or applying a silane-based compound to form a layer, and reducing the layer. In this case, the silane-based compound may include hydrogenated silicon ($Si_nH_{2n+2}$) and an organic compound in which a hydrogen atom of the hydrogenated silicon is substituted with a hydrocarbon group, a halogen group, an alkoxy group, and a hydroxy group, and may include, for example, at least one of silane, chlorosilane, dichlorosilane, trichlorosilane, tetraalkylsilane, chlorotrialkylsilane, dichlorodialkylsilane, and trichloroalkylsilane, but the silane-based compound is not limited thereto.

In the present specification, the hydrocarbon group is a functional group of an organic compound composed of only carbon and hydrogen, and the hydrocarbon group may be any one group of a straight-chained or branch-chained alkyl group, an alkenyl group, a fluorene group, a cycloalkyl group, and an aryl group, or a group in which two or more groups are linked.

In the present specification, examples of the halogen group include fluorine, chlorine, bromine, iodine, and the like, but are not limited thereto.

In the present specification, the alkoxy group preferably has 1 to 12 carbon atoms, and more specific examples thereof include methoxy, ethoxy, isopropyloxy, and the like, but are not limited thereto.

In the present specification, the alkyl group may be straight-chained or branch-chained, and the number of carbon atoms thereof is not particularly limited, but is preferably 1 to 12. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight-chained or branch-chained, and the number of carbon atoms thereof is not particularly limited, but is preferably 2 to 12. Specific examples thereof include a butenyl group; a pentenyl group; or an alkenyl group to which an aryl group such as a stylbenyl group and a styrenyl group is linked, but are not limited thereto.

In the present specification, the fluorenyl group has a structure in which two cyclic organic compounds are linked to each other through one atom, and examples thereof include

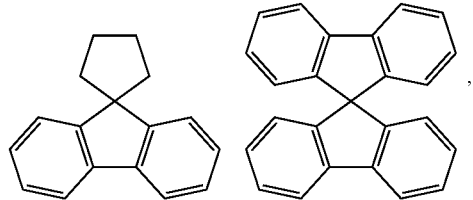

and the like.

In the present specification, the fluorenyl group includes the structure of an open fluorenyl group, and herein, the open fluorenyl group has a structure in which the linkage of one ring compound is broken in the structure of two ring compounds linked through one atom, and examples thereof include

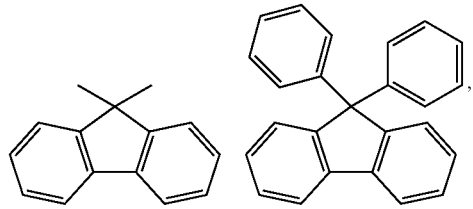

and the like.

In the present specification, the cycloalkyl group may be monocyclic or polycyclic, and the number of carbon atoms thereof is not particularly limited, but is preferably 6 to 40. Specific examples thereof include a cyclopropyl group, a cyclobutyl group, a cyclopentyl group, a cyclohexyl group, a cycloheptyl group, and the like, but are not limited thereto.

In the present specification, the aryl group may be monocyclic or polycyclic, and the number of carbon atoms thereof is not particularly limited, but is preferably 6 to 40. Examples of the monocyclic aryl group include a phenyl group, a biphenyl group, a terphenyl group, stylbene, and the like, examples of the polycyclic aryl group include a naphthyl group, an anthracenyl group, a phenanthrene group, a pyrenyl group, a perylenyl group, a chrysenyl group, a fluorene group, and the like, but the examples are not limited thereto.

In the method for manufacturing an anode, the explanation on the lithium metal layer and the metal layer or metal oxide layer may depend from those described above.

[Mode for Invention]

Hereinafter, the present specification will be described in more detail through Examples. However, the following Examples are provided only for exemplifying the present specification, but are not intended to limit the present specification.

EXAMPLES

Example 1

A composition including silicon and PVdF at a weight ratio of 90:10 was coated to have a thickness of 10 μm on a lithium foil to form a protective layer (passivation layer), thereby manufacturing an anode.

Comparative Example 1

A pure lithium foil was used as an anode without a protective layer.

Comparative Example 2

Lithium phosphorous oxynitride (LiPON) was used to form a protective layer having a thickness of 10 μm instead of the protective layer of Example 1 on the lithium foil by sputtering, thereby manufacturing an anode.

Experimental Example 1

For the efficiency of the battery, cycle efficiency characteristics were measured by constituting a battery cell under the following conditions. The results are shown in the following Table 1.

Working electrode: Anodes of Example 1 and Comparative Examples 1 and 2
Counter electrode: Lithium metal electrode
Electrolytic solution: Carbonate-based electrolyte including a lithium salt and Solvent

TABLE 1

|  | Cycle efficiency (%) |
|---|---|
| Example 1 | 96 |
| Comparative Example 1 | 65 |
| Comparative Example 2 | 72 |

The invention claimed is:
1. An anode comprising:
a current collector;
a lithium metal layer provided on the current collector;
a lithium-silicon composite layer provided on the lithium metal layer; and
a silicon layer or silicon oxide layer provided on the lithium-silicon composite layer
wherein the silicon layer or silicon oxide layer comprises 5-20 parts by weight binder resin based on 100 parts by weight silicon and silicon oxide in the silicon layer or silicon oxide layer.

2. The anode of claim 1, wherein the silicon layer or silicon oxide layer comprises a lithium-silicon composite in which the silicon or silicon oxide is alloyed with lithium.

3. The anode of claim 1, wherein a weight ratio of a lithium element to a silicon element in the anode is 100:1 to 50.

4. The anode of claim 1, wherein the lithium-silicon composite layer comprises a lithium-silicon composite represented by the following Chemical Formula 1 or a lithium-silicon oxide composite represented by the following Chemical Formula 2:

$Li_xSi$  [Chemical Formula 1]

$Li_oSiO_p$  [Chemical Formula 2]

in Chemical Formulae 1 and 2, x is a real number of 1.0 to 4.0, o is each a real number of 0.3 to 4.0, and p is each a real number of 0.1 to 2.0.

5. The anode of claim 1, wherein the silicon layer or silicon oxide layer is the outermost layer.

6. An anode comprising:
a current collector;
a lithium metal layer provided on the current collector; and
a lithium-silicon composite layer provided on the lithium metal layer and containing a lithium-silicon composition in which silicon or silicon oxide is alloyed with lithium,
wherein the lithium-silicon composite layer comprises 5-20 parts by weight binder resin based on 100 parts by weight silicon and silicon oxide in the lithium-silicon composite layer.

7. The anode of claim 6, wherein the lithium-silicon composite layer comprises a lithium-silicon composite represented by the following Chemical Formula 1 or a lithium-silicon oxide composite represented by the following Chemical Formula 2:

$Li_xSi$  [Chemical Formula 1]

$Li_oSiO_p$  [Chemical Formula 2]

in Chemical Formulae 1 and 2, x is a real number of 1.0 to 4.0, o is each a real number of 0.3 to 4.0, and p is each a real number of 0.1 to 2.0.

8. The anode of claim 6, wherein the lithium-silicon composite layer is the outermost layer.

9. A lithium secondary battery comprising:
the anode of claim 1; and a cathode, and
an electrolyte provided between the anode and the cathode.

10. The lithium secondary battery of claim 9, wherein the electrolyte is an electrolyte liquid in which the anode and the cathode are impregnated.

11. The lithium secondary battery of claim 10, further comprising:
a separation membrane provided between the anode and the cathode.

12. The lithium secondary battery of claim 9, wherein the electrolyte is a solid electrolyte membrane or a polymer electrolyte membrane.

13. A battery module comprising the lithium secondary battery of claim 9 as a unit cell.

\* \* \* \* \*